Nov. 16, 1948. H. C. PERMAN 2,453,755
LOAD MOVING MACHINE
Filed May 15, 1946 2 Sheets-Sheet 1
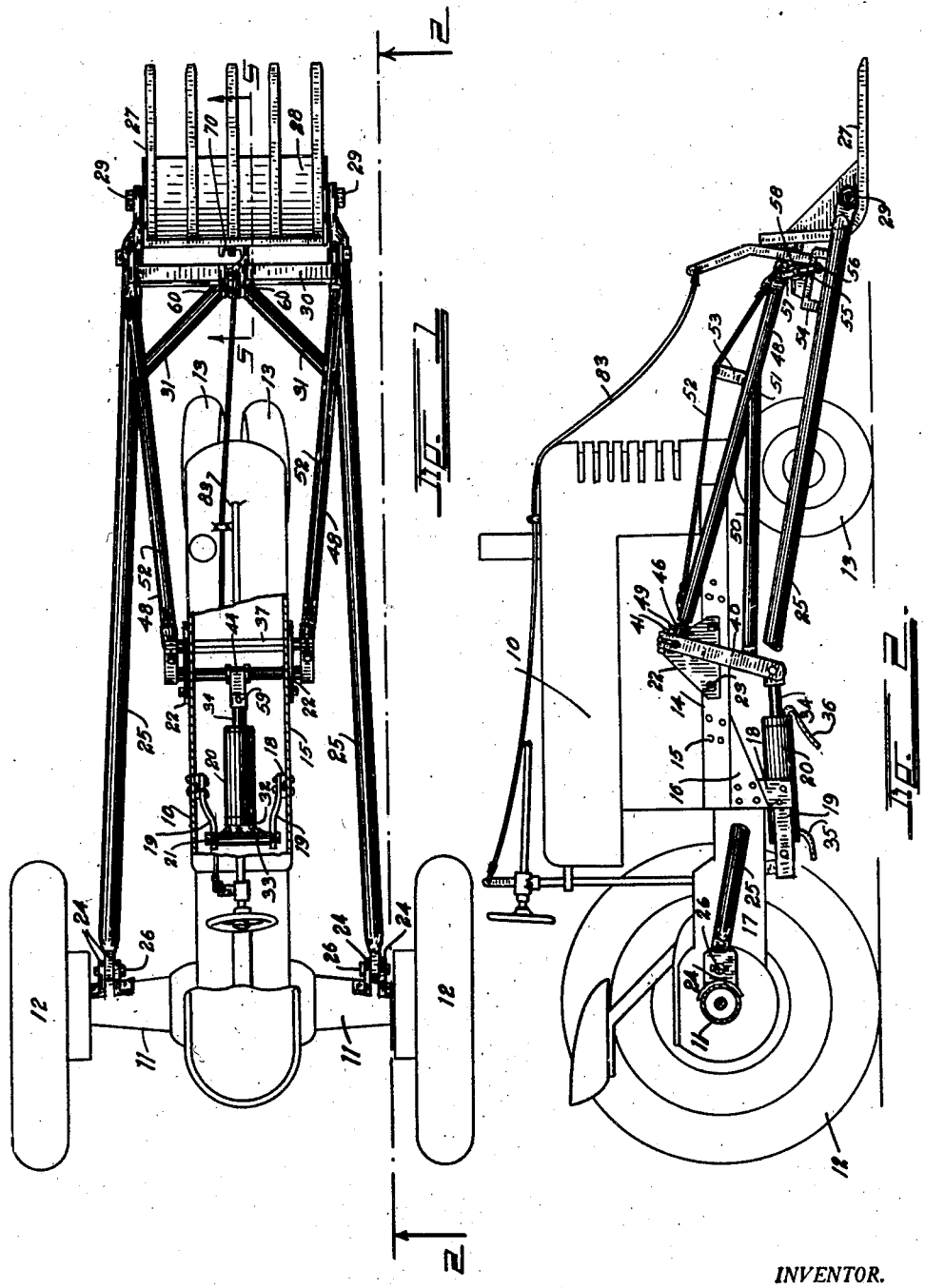
INVENTOR.
HORACE C. PERMAN
BY
Martin E Anderson
ATTORNEY.

Nov. 16, 1948.  H. C. PERMAN  2,453,755
LOAD MOVING MACHINE
Filed May 15, 1946  2 Sheets-Sheet 2
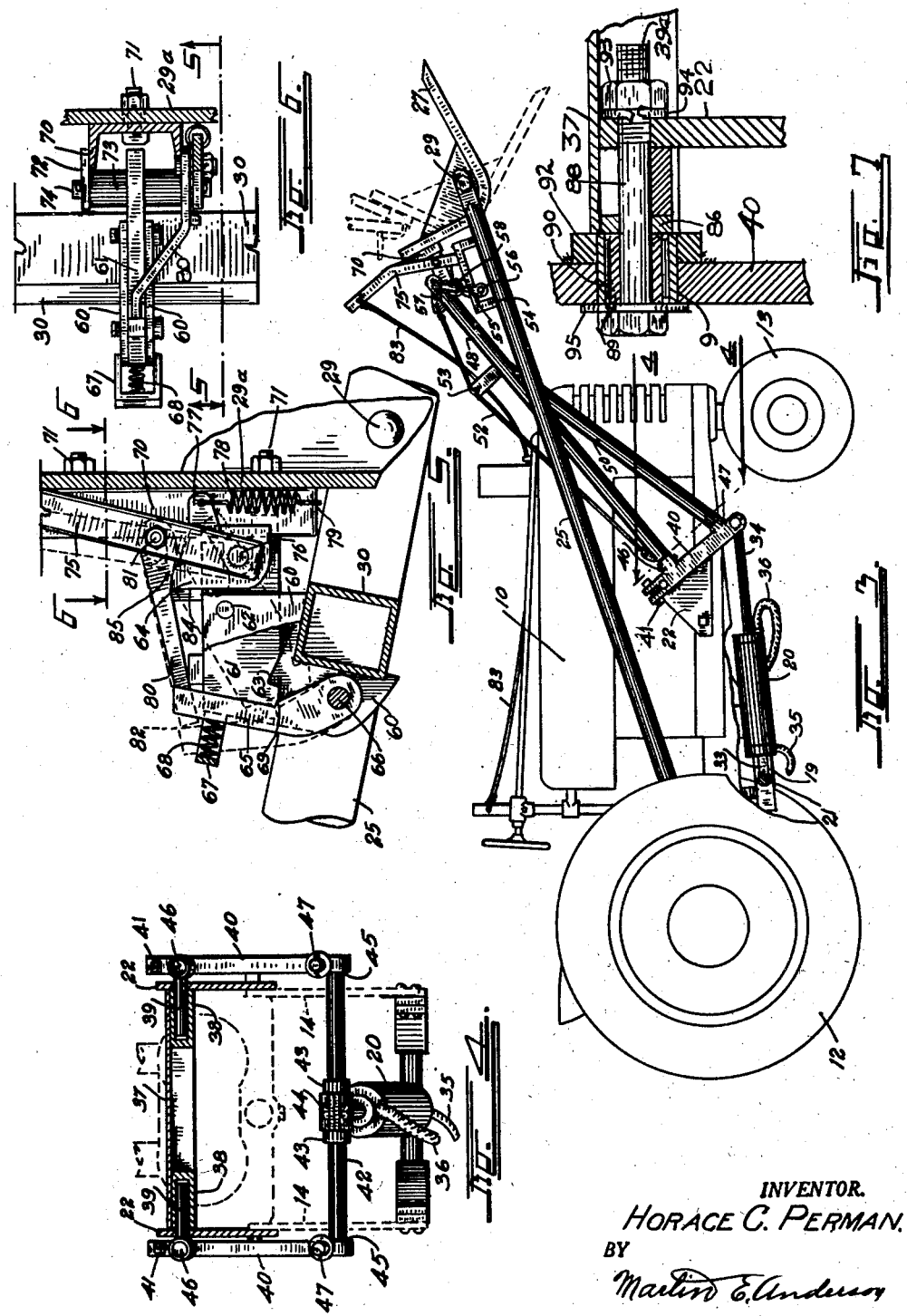
INVENTOR.
HORACE C. PERMAN.
BY
Martin E. Anderson
ATTORNEY.

Patented Nov. 16, 1948

2,453,755

UNITED STATES PATENT OFFICE 2,453,755

LOAD MOVING MACHINE

Horace C. Perman, Waterloo, Iowa

Application May 15, 1946, Serial No. 669,838

4 Claims. (Cl. 214—140)

This invention relates to improvements in load moving machines and more particularly to load moving and material handling machines of the type mounted on tractors and operated by power derived from the tractor engine.

The principal object of this invention is to produce an operating mechanism of a simple and sturdy construction that can be readily attached to a tractor of common construction, for operation by oil supplied by the high pressure oil pump of the tractor.

Another object is to provide a power actuated means comprising a hydraulic cylinder and piston positioned underneath the tractor removably connected with the tractor frame and independent of the rear axle housing and the tractor drawbar.

A further object is to provide a lifting mechanism comprising a rocker of wide U-shape, pivoted at its upper end in bearings secured to the tractor frame, with means at its base or lower end for effecting a connection with the piston rod of the hydraulic mechanism.

A still further object is to provide a mechanism that can be readily attached to and removed from the tractor, leaving the rocker and the hydraulic cylinder in place.

A further object is to provide a novel fork retaining and tripping means.

Another object is to produce a machine of the type referred to in which the parts are entirely free from the drawbar.

A further object is to produce a hydraulic machine in which the power is transmitted in such a way that no torsional strains are produced in the operating means.

The above and other objects that may become apparent as this description proceeds are attained by means of a construction and an arrangement of parts that will now be described in detail and for this purpose reference will be had to the accompanying drawings in which the invention has been illustrated in its preferred form, and in which:

Figure 1 is a top plan view of a tractor showing my improved load moving device attached thereto, portions of the tractor being broken away to better disclose the construction;

Figure 2 is a side elevation of the machine shown in Figure 1, the fork being shown in its load gathering or lowermost position;

Figure 3 is a view similar to that shown in Figure 2 and shows the parts in elevated position;

Figure 4 is a section taken on line 4—4, Figure 3;

Figure 5 is a section taken on lines 5—5, Figures 1 and 6, and shows the fork latching mechanism;

Figure 6 is a section taken on line 6—6, Figure 5; and

Figure 7 is a fragmentary view, similar to Figure 4, and shows a modified form of bearing.

In the drawing reference numeral 10 designates the body of a tractor and reference numerals 11 the rear axle thereof to which pneumatic tired wheels 12 are attached. The front wheels have been designated by reference numeral 13. The tractor is provided with a frame having two side members 14 which are normally provided with a large number of openings 15 to facilitate the attachment of auxiliary mechanisms thereto.

In the embodiment illustrated a gusset plate 16 is provided between frame member 14 and the crank case 17. Plates 18 are secured to the inner surfaces of the gusset plates, on opposite sides of the tractor, and have secured to their lower ends rearwardly extending arms 19 to the rear ends of which the cylinder 20 is rockably connected by means of a pivot 21. Secured to the outside of side frame members 14 are bearing plates 22 that are held in position by means of bolts or rivets 23. Bolted to the rear axle housing on each side of the center thereof are two pairs of lugs 24 that are spaced for the reception of the flattened rear end of the main shovel frame arms 25, as shown in Figure 1. Arms 25 are connected to the lugs by means of pivots 26. Pivotally connected with the front ends of arms 25 is a fork 27 whose tines are welded or otherwise secured to a curved plate 28. The point of connection between the arms 25 and the fork has been indicated by reference numeral 29. Extending between the front ends of arms 25 is a tubular spacer bar 30 which has been shown more clearly in Figures 4 and 5. Diagonal braces 31 have ends welded to the two arms 25 and to the spacer member 30 in the manner shown in Figure 1.

Cylinder 20 is provided at its rear end with a cap 32 that has a transversely extending bearing 33 through which the pivot 21 extends. This cylinder is provided with the ordinary piston and the connecting rod has been designated by reference numeral 34. A tube or a flexible hose 35 extends between the rear end of the piston and the high pressure oil pump with which the tractor is provided, and another flexible tubular member 36 extends from the front end of the cylinder to the oil sump, so that any leakage oil will be returned to the sump. The upper ends of plates 22 are connected by means of an inverted channel 37, as shown in Figure 4, and secured to the inside of the channel and the inner surfaces of plates 22, are tubular bearings 38 in which are mounted for rotation the two pivots 39. Extending downwardly from the outer end of each pivot is an arm 40. These arms are secured to the outer ends of the pivots by means of a clamping bolt 41 or in any other suitable way. A strong steel shaft 42 connects the lower ends of arms 40 and this is provided adjacent its center with two spaced collars 43 between which is mounted a bearing block 44. The ends of shaft 42 are preferably welded to the lower ends of the arms at the points indicated by reference numeral 45 so as to form a rigid structure that has the general appearance of a wide U. The upper ends of arms 40 are provided with forwardly facing cups 46 and the lower ends with forwardly projecting plugs 47. A lifting arm structure of somewhat Y-shape is secured to each arm 40, in the manner shown in Figures 2 and 3. The lifting arm structure comprises tubular members 48 whose rear ends extend into the cup 46 and are secured to the cups by means of removable bolts 49. Struts or compression members 50 have their front ends welded to the tubular member 48 at point 51 and are positioned with their rear ends in telescopic engagement with plugs 47. So long as pins 49 are in place, the lifting arm assemblies are operatively connected with arms 40. Truss rods 52 extend from one end of members 48 to the other and are spaced therefrom by means of blocks 53. It is to be understood that the lifting arm structures are identical on both sides of the tractor. Secured to the upper surface of each of the main arms 25, adjacent their front ends, are loops 54. A clevis 55 carries roller 56 that is movably mounted in the opening between the outer wall of the loop and arm 25. Clevis 55 is connected to the front end of the lifting arm structure, directly above, by means of anchor clevis 57 and a link 58. It is now evident that if the U-shaped frame comprising arms 40 is rotated about the pivots 39 in a counterclockwise direction from that shown in Figure 2, it will move the parts upwardly into the position shown in Figure 3. By the simple expedient of removing pin 49, the lifting arm structure can be disconnected from the tractor.

The power or force for turning the parts from the position shown in Figure 2 to that shown in Figure 3 is derived from high pressure oil delivered from a pump with which the tractor is provided and this oil enters the cylinder through tubular member 36 and forces the piston and piston rod forwardly, turning the U-shaped member and the lifting arms in counterclockwise direction.

At this point attention is called in particular to the fact that the U-shaped frame comprising the two arms 40 and the connecting shaft 42 does not employ what may be termed a "torque shaft" that is the pivots 39 are short and are entirely separate and merely serve as means for rotatably pivoting the U-shaped member. No force is transmitted through the pivots 39. The connection between the piston rod 34 and the bearing 44 is such that a slight rocking movement may take place about the pivot 59. In case the shovel or fork should be more highly loaded on one side or the other, so as to produce a slight warping of the U-shaped frame, such warping can take place without subjecting the piston rod to any bending strains.

It is, of course, essential that the shovel or fork shall be constructed or provided with a latch mechanism that will hold it securely in operative position and which can be readily released to effect the dumping of the load. This latch mechanism has been illustrated in Figures 3, 5 and 6 to which reference will now be had.

Referring now to Figure 5, it will be seen that the spacer member 30 is attached to the main lifting arms 25 and carries two spaced plates 60 that are welded to two sides of member 30 as shown in Figure 5. Positioned between plates 60 is a latch member 61 that is mounted for oscillation about pivot 62. This member has a notch 63 for engaging a corner of member 30 when it is moved into the dotted line position shown in Figure 5. The other end of latch member 61 has an opening extending inwardly, which is best shown from the dotted line position where it has been designated by reference numeral 64. A latch pawl 65 is pivoted between plates 60 at pin 66 and extends to a point above these plates. A U-shaped spring abutment 67 has its ends welded to the outer surfaces of plates 60, as shown in Figure 6, and forms an abutment for spring 68 that urges the upper end of the latch pawl 65 inwardly to the position shown in Figure 5. The latch pawl has a notch 69 into which the lower outer corner of the latch member 61 extends when the parts are in the full line position. It is evident that latch member 61 cannot move in a counterclockwise direction so long as the latch pawl 65 is in the position shown.

The fork or shovel is pivotally connected with the arms 25 so as to tilt about pivots 29 and has secured to the back plate 29a a channel 70, by means of bolts 71, which extend through slotted holes in plate 29a so that adjustments may be made for obtaining the most desirable operation. Welded to the flanges of the channel are two plates 72 between which a tube 73 is welded to plate 72. When the fork is in operative position, as shown in Figure 3, the roller is positioned in the notch 64 in the front or the outer end of the latch member 61 and since the latter is locked against rotation, it is evident that the fork will remain in the position shown in Figure 2 until the latch is released. For the purpose of releasing the latch to permit the load carried by the fork to be dumped, that is, to permit the fork to move from full line to dotted line position in Figure 3, a mechanism is employed which comprises a trip lever 75 that is pivoted at 76 and which has a forwardly extending lug 77 to which the upper end of spring 78 is attached. The lower end of this spring is connected with the lower end of the channel at the point indicated by reference numeral 79. Spring 78 tends to move the trip lever in a clockwise direction when viewed as in Figure 5. A trip release pawl 80 is pivoted to trip lever 75 at point 81. This lever is normally positioned with its end in close engagement or in contact with the upper end of the latch pawl at point 82. It will now be evident that, with the parts in the position shown in Figures 3 and 5, a pull on the trip rope 83 will turn lever 75 counterclockwise about its pivot and move the trip pawl 80 towards the left, thereby turning the latch pawl 65 to dotted line position. As soon as pawl 65 has moved sufficiently to withdraw its support from the latch 61, the latter will be free to move and will turn in response to the force exerted on it by the fork, releasing the latter and permitting it to move to dotted line position shown in Figure 3. In this position the load will automatically leave the fork and the latter can then be returned to latched position by exerting another pull on trip rope 83 which moves the trip lever against the abutment 84. When the fork, together with the roller 73 approaches the normal or latched position, the roller will enter notch 64 and turn member 61 in a clockwise direction until it moves back into the full line position, whereupon the fork or shovel will be latched and ready to take on another load as soon as it is lowered into the position shown in Figure 2.

Attention is called to the part 64 and to the fact that the lower surface of trip pawl 80 is curved as shown at 85 and therefore whenever lever 75 is moved counterclockwise about its pivot, trip pawl 80 will have its outer end moved upwardly until it attains a position in which pawl 65 is free to respond to the force of spring 68 and to move into latching position. After the fork has been brought back to normal load holding position and the tension on the trip rope is released, spring 78 will act to move the trip lever into full line position where the parts will then be ready for both holding the fork in the predetermined position and for releasing it when another load is to be dumped.

In Figure 4 the bearing for pivotally supporting the rocking U has been shown in a general way because various forms of bearings may be used.

In Figure 7 a section through one of the pivot bearings has been shown to about one-half full size. Channel 37 extends to the outside of the supporting brackets 22 and is secured to the upper ends of the latter by welding. In each end of the channel a perforated member 86 is positioned and welded in position. A spacer plate 87 extends between the flanges of the channel and members 22 and 86 and is welded in position. Members 22 and 86 have openings for bolt 88 that serves as a support for the inner race 89 of a needle bearing whose outer race 90 is firmly secured in the opening 91 in member 40 in the spacer 92 that is secured thereto by welding. A nut 93 and a lock washer 94 holds the bolt in position. Washer 95 forms a stop for the outer surface of oscillating member 40. Only one bearing has been illustrated because the other is identical with it in construction. It is understood, of course, that specifically different bearings may be designed and used if desired.

It will be observed that the fork or shovel is returned to latched position by exerting a slight pull on rope 83 and this makes it easy and convenient to bring the fork into latched position. The construction shown does not require the parts to be operated so as to cause the fork to swing as has been done in other cases.

The use of the loop 54 and the roller 56 assures that the connection between the end of the lifting arm and the main arms 25 will automatically adjust itself so as to bring the connecting elements into line with the resultant force. The lifting arm assemblies can be removed by the simple expedient of removing pins 49 after which pivots 26 may be removed, thereby freeing the tractor from these parts leaving only the hydraulic mechanism and the U-shaped rocking frame.

Having described the invention what is claimed as new is:

1. A tractor mounted load moving machine comprising a wheel supported tractor body, aligned bearings secured to opposite sides of the tractor body, a U-shaped rocker positioned with its base underneath the tractor body, the upper ends of the limbs having pivots journaled in the bearings, a hydraulic cylinder positioned underneath the tractor body with one end pivotally connected therewith, a piston and piston rod operatively associated with the cylinder, the outer end of the piston rod being pivoted to the base of the U-shaped rocker, a lifting arm removably connected with each limb of the U-shaped rocker, projecting forwardly from the latter, a load moving means comprising a rigid beam on each side of the tractor body positioned below the lifting arms, the rear ends of the beams being pivotally connected with the tractor body adjacent the rear axle, means comprising a load carrying element interconnecting the front ends of the beams, and a tension element connecting the front end of each lifting arm with the corresponding beam, whereby when the piston rod is moved forwardly the load carrying element will be raised.

2. A mechanism in accordance with claim 1 in which the connection between the piston rod and the base of the U-shaped rocker comprises a hinge having a limited angular movement about a vertical pivot, whereby strains tending to bend the piston rod laterally will be prevented.

3. A tractor mounted load moving machine comprising an elongated body having supporting wheels at its front and rear ends, axially aligned bearings, on opposite sides of the body, a U-shaped rocker frame positioned with its base underneath the body, the upper ends of the limbs having a pivotal connection with the bearings, a hydraulic force exerting device comprising a cylinder, a piston and a piston rod positioned beneath the tractor body, the rear end of the cylinder being connected with the tractor body for movement about a transverse pivot and the front end of the piston rod being pivoted to the center of the base of the U-shaped rocker, the limbs of the rocker having their forward sides provided with sockets near the axis of pivotation, and a plug near the base, for use in releasibly attaching lifting arms thereto.

4. A tractor mounted load moving machine comprising an elongated body having supporting wheels at its front and rear ends, axially aligned bearings, on opposite sides of the body, a U-shaped rocker frame positioned with its base underneath the body, the upper ends of the limbs having pivotal connection with the bearings, a hydraulic force exerting device comprising a cylinder, a piston and a piston rod positioned beneath the tractor body, one end of the cylinder being connected with the tractor body for movement about a transverse pivot and the front end of the piston rod being pivoted to the center of the base of the U-shaped rocker, the limbs of the rocker having their forward sides provided with sockets near the axis of pivotation and plugs near the base, a lifting arm comprising a substantially Y-shaped tubular member attached to each limb, one of the spaced ends extending into the socket and the other telescoped over the plug, and a pin extending through the socket and the end of the lifting arms positioned therein.

HORACE C. PERMAN.

REFERENCES CITED

The following references are of record in the file of this patent:

UNITED STATES PATENTS

| Number | Name | Date |
|---|---|---|
| 1,713,030 | Cummings | May 14, 1929 |
| 2,126,791 | Low | Aug. 16, 1938 |
| 2,286,947 | Bankson | June 16, 1942 |
| 2,404,820 | Wuertz et al | July 30, 1946 |
| 2,412,570 | Ender | Dec. 17, 1946 |
| 2,415,892 | Koehl et al | Feb. 18, 1947 |